(12) United States Patent
Schwitzer et al.

(10) Patent No.: US 10,754,447 B2
(45) Date of Patent: Aug. 25, 2020

(54) STYLUS CAPSULE

(71) Applicant: Microsoft Technology Licensing, LLC, Redmond, WA (US)

(72) Inventors: Amit Schwitzer, Hertzeliya (IL); Shai Rogel, Kadima (IL); Vadim Mishalov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 15/867,683

(22) Filed: Jan. 10, 2018

(65) Prior Publication Data
US 2019/0212835 A1    Jul. 11, 2019

(51) Int. Cl.
*G06F 3/0354* (2013.01)
*G06F 3/038* (2013.01)
*H01Q 1/22* (2006.01)

(52) U.S. Cl.
CPC ........ *G06F 3/03545* (2013.01); *G06F 3/0383* (2013.01); *H01Q 1/2258* (2013.01)

(58) Field of Classification Search
CPC ............................ G06F 3/03545; G06F 3/0383
See application file for complete search history.

(56) References Cited

U.S. PATENT DOCUMENTS

| | | | |
|---|---|---|---|
| 7,656,355 B2 | 2/2010 | Hsin | |
| 8,139,049 B1* | 3/2012 | Brandon | G06F 3/03545 345/179 |
| 8,878,823 B1 | 11/2014 | Kremin et al. | |
| 9,170,662 B2* | 10/2015 | Kim | B43K 23/008 |
| 9,229,547 B2* | 1/2016 | Kinoshita | G06F 3/0386 |
| 9,304,610 B2* | 4/2016 | Case | G06F 1/182 |
| 9,720,526 B2* | 8/2017 | Yeh | G06F 3/0383 |
| 10,185,410 B2* | 1/2019 | Roudaut | B43K 29/18 |
| 2002/0097232 A1* | 7/2002 | Pogatetz | G06F 3/03545 345/179 |
| 2006/0045604 A1* | 3/2006 | Fukui | B25G 1/00 401/6 |
| 2006/0232570 A1 | 10/2006 | Yuen et al. | |
| 2008/0291178 A1 | 11/2008 | Chen et al. | |
| 2012/0039662 A1* | 2/2012 | Zhang | B43K 29/00 401/195 |
| 2013/0002606 A1* | 1/2013 | Mann | G06F 3/0383 345/174 |
| 2014/0028635 A1 | 1/2014 | Krah | |
| 2014/0028636 A1* | 1/2014 | Zhang | G06F 3/033 345/179 |

(Continued)

OTHER PUBLICATIONS

"International Search Report and Written Opinion Issued in PCT Application No. PCT/US18/066338", dated Mar. 21, 2019, 15 pages.

(Continued)

*Primary Examiner* — Peter D McLoone

(57) ABSTRACT

In various examples there is a capsule of a stylus for operation with a digitizer device. The capsule is sized and shaped to fit within a housing of the stylus and is a modular capsule which can be used in different styli. The capsule comprises a generally cylindrical housing tapered at a tip end and formed from plastics material. The capsule has a stylus tip comprising a tip antenna. The capsule has at least one antenna printed on an outer surface of the housing.

20 Claims, 8 Drawing Sheets

(56) References Cited

U.S. PATENT DOCUMENTS

| | | | |
|---|---|---|---|
| 2014/0035887 A1* | 2/2014 | Kim | B43K 23/008 |
| | | | 345/179 |
| 2014/0050516 A1 | 2/2014 | Lazaridis et al. | |
| 2014/0340369 A1* | 11/2014 | Case | G06F 3/03545 |
| | | | 345/179 |
| 2015/0084933 A1* | 3/2015 | Kinoshita | G06F 3/0386 |
| | | | 345/179 |
| 2015/0116291 A1 | 4/2015 | Leung et al. | |
| 2015/0205390 A1* | 7/2015 | Yeh | G06F 3/0383 |
| | | | 345/179 |
| 2015/0309598 A1* | 10/2015 | Zeliff | G06F 3/044 |
| | | | 345/179 |
| 2016/0062492 A1 | 3/2016 | Geller et al. | |
| 2016/0077612 A1* | 3/2016 | Rolion | B43K 29/00 |
| | | | 345/173 |
| 2016/0091991 A1 | 3/2016 | Zimmerman et al. | |
| 2016/0116999 A1* | 4/2016 | Boisdevesys | G06F 3/03545 |
| | | | 345/179 |
| 2016/0299584 A1* | 10/2016 | Clark | G06F 3/03545 |
| 2016/0320869 A1* | 11/2016 | Bez | B43K 29/00 |
| 2016/0370888 A1* | 12/2016 | Roudaut | B43K 29/18 |
| 2017/0010697 A1 | 1/2017 | Jiang et al. | |
| 2017/0068342 A1* | 3/2017 | Zimmerman | G06F 3/04162 |
| 2017/0329422 A1* | 11/2017 | Malinverni | B43K 29/00 |
| 2017/0344136 A1 | 11/2017 | Mishalov et al. | |

OTHER PUBLICATIONS

Teyssier, et al., "VersaPen: An Adaptable, Modular and Multimodal I/O Pen", In Proceedings of CHI Conference Extended Abstracts on Human Factors in Computing Systems, May 6, 2017, pp. 2155-2163.

* cited by examiner

STYLUS CAPSULE

BACKGROUND

Touch screen displays such as in tablet computers, smart phones and other electronic devices, typically incorporate a digitizer which operates to sense location relative to the touch screen of a user's finger or a stylus. The stylus itself has multiple internal components including printed circuit boards, sensors, transmitters and other components.

Cost and ease of manufacture of such a stylus is an ongoing consideration, as are the considerations of the limited space available within the stylus and the quality of the signals transmitted by one or more transmitters in the stylus.

The embodiments described below are not limited to implementations which solve any or all of the disadvantages of known transmitters or styli.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a capsule of a stylus for operation with a digitizer device. The capsule is sized and shaped to fit within a housing of the stylus and is a modular capsule which can be used in different styli. The capsule comprises a generally cylindrical housing tapered at a tip end and formed from plastics material. The capsule has a stylus tip comprising a tip antenna. The capsule has at least one antenna printed on an outer surface of the housing.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

By having a modular capsule, which is manufactured and sold as a single entity, it is possible to re-use the capsule in different designs of styli. The costs of manufacture and transportation of the modular capsule are low since the stylus housing and other components of the stylus are not included in the capsule. The assembly process for assembling the capsule inside a stylus housing is very straightforward which leads to improved quality and reduced costs. There is reduced risk of malfunction of the resulting stylus because the capsule is a single module despite movement of the shaft and optional other moving components in the capsule.

Electronic devices such as tablet computers, smart phones, smart watches and others often incorporate a touch panel to display information and to receive one or more user inputs made by touching the display. The touch panel is typically a mutual capacitance touch panel with a capacitive sensing medium referred to as a digitizer device incorporating a plurality of row electrodes (referred to as transmit electrodes) and a plurality of column electrodes (referred to as receive electrodes) arranged in a rectangular grid pattern. A drive signal voltage is applied on the transmit electrodes and a voltage is measured at each receive electrode. Since the human body is an electrical conductor, when a finger touches or comes close to the touch panel, an electrostatic field of the touch panel is distorted and this produces a measurable change at the receive electrodes. The terms "electrode", "antenna" and "transmitter" have the same meaning herein.

Coordinates of the user input at the touch panel are computed from the measured change and interpolation may be used to compute coordinates of user input positions within individual cells of the grid rather than at intersections of the grid.

Where a stylus 200 or pen is used in conjunction with the touch panel, the stylus or pen incorporates one or more drive electrodes (referred to as herein as transmitters) so that drive electrodes at the touch panel itself may be used as receive electrodes. The present technology is concerned with a capsule for use inside such a stylus.

Figure 1A:
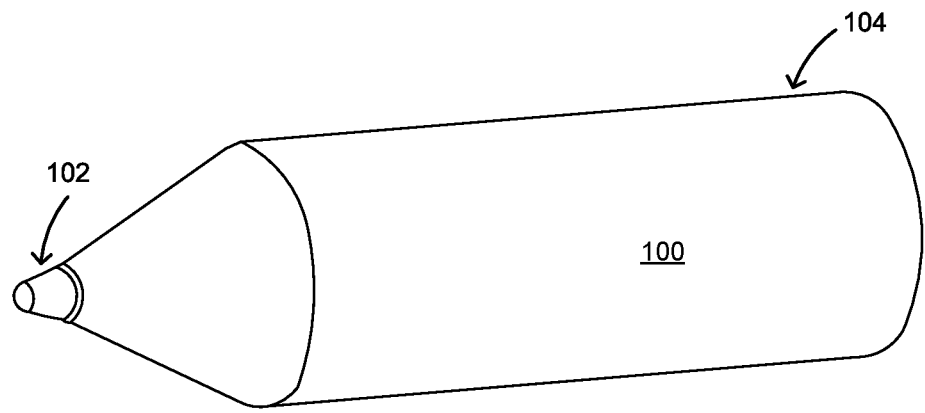
FIG. 1A is a schematic diagram of a stylus.

FIG. 1A is a perspective view of a stylus 100 with a tip end 102 and a distal end 104. The stylus incorporates a plurality of components which are not visible in FIG. 1A, such as one or more transmitters, one or more pressure sensors for detecting pressure of a tip of the stylus on a surface, a printed circuit board, a power mechanism and other components.

Figure 1B:
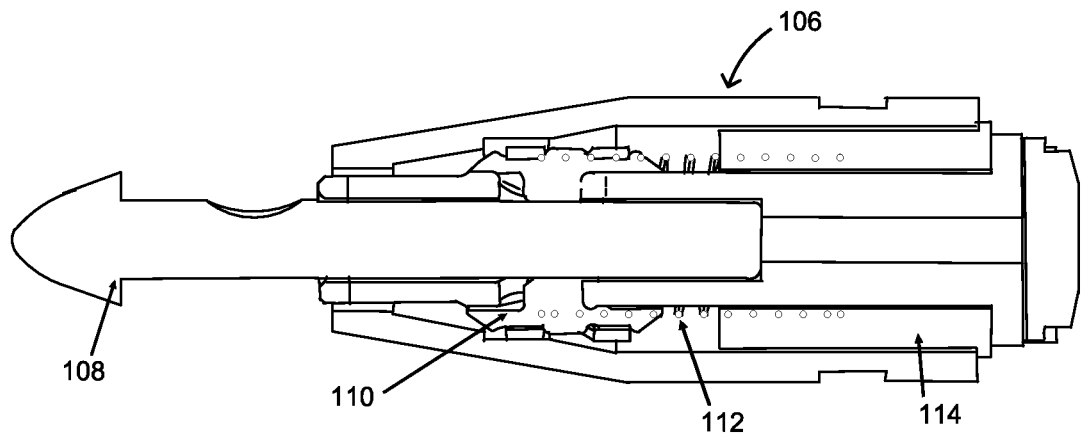
FIG. 1B is a schematic diagram of a cross section through a capsule where the capsule is suitable for use in a stylus such as the stylus of FIG. 1A.
Figure 1C:
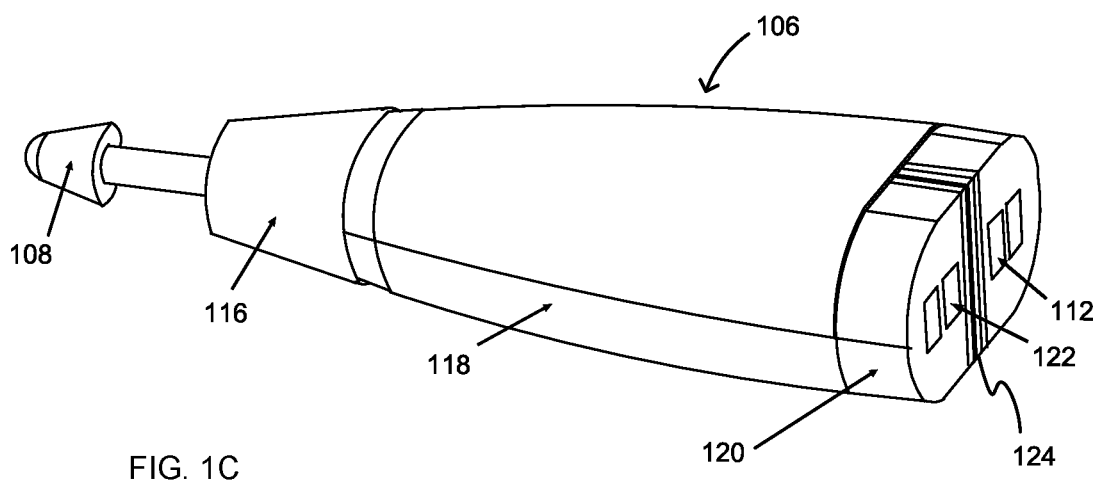
FIG. 1C is a perspective view of another capsule for use in a stylus such as the stylus of FIG. 1A

FIG. 1B and FIG. 1C show examples of two different capsules 106, either of which are inserted into the stylus 100. Each capsule has a shaft 108 which runs along a longitudinal axis of the capsule interior and has a stylus tip at one end protruding from the capsule. When the stylus is used a person holds the stylus in his or her hand, as if using a conventional pen or pencil, and presses the stylus tip against a surface such as a tablet computer screen or other surface. An optional pressure sensor in the stylus is able to detect the pressure on the shaft 108. In the case of the capsule of FIG. 1B the pressure sensor is external to the capsule. In the case of the capsule of FIG. 1C the pressure sensor is within the capsule. However, in both cases, the capsule contains moving components since the shaft 108 moves slightly, back and forth along its longitudinal axis, and slightly side to side as lateral forces are exerted on the tip. One or more bearing surfaces in the capsule act to minimize the side to side movement and to convey the forces along the longitudinal axis of the shaft 108. By having the bearing surfaces in the capsule manufacturing is simplified as compared with having the bearing done on different parts. Note that it is not essential for the capsule to comprise a pressure sensor and that the pressure sensor of FIG. 1B may be omitted.

In the examples of FIGS. 1B and 1C the stylus tip comprises an antenna (also referred to as an electrode) which interoperates with the digitizer as described with reference to FIGS. 2 and 3. In various examples, at least one further antenna, such as a tilt antenna, is printed onto an outer surface of the capsule 106 as described in more detail later in this document.

Both capsules 106 have a generally cylindrical housing tapered at a tip end and formed from plastics material. The term "generally cylindrical" means tubular and where the tube has the same diameter along its length, or different diameters along its length such as when it is tapered in one or more places. The term "generally cylindrical" includes tubes where the cross section is not circular, such as where the cross section is oval or has another two dimensional shape. Each capsule 106 has a stylus tip comprising a shaft 108 extending along a longitudinal axis of the interior of the housing and protruding from the tip end of the housing, the shaft being part of a pressure sensing mechanism to sense pressure of the stylus tip on a surface in use. Each capsule has at least one bearing surface 110, against which the shaft 108 is guided in use, on an inner surface of the housing. Each capsule is a single entity sized and shaped to fit within a plurality of different styli housings.

In the example of FIG. 1B the capsule 106 comprises a metal flange which is generally cylindrical and provides a bearing surface against which the shaft 108 is guided. The capsule 106 also has a coil spring 112 around the shaft 108 which acts to bias the shaft 108 towards the tip end of the capsule.

In the example of FIG. 1C the capsule 106 has a printed antenna 116 on an outer surface of the housing. The capsule 106 of FIG. 1B also has one or more printed antennas on its outer surface as explained in more detail below. For example, the printed antenna 116 is a tilt antenna which transmits signals to a digitizer panel. The digitizer panel is able to detect the location of the tilt antenna as well as the location of the tip of the stylus and, since the distance between the tip and the tilt antenna is known, is able to compute the tilt of the stylus with respect to a plane of the digitizer panel using triangulation. In the example of FIG. 1C there is one printed antenna 116 but other numbers of antennas (zero, one or more) are provided on the surface of the capsule in other examples. Note that it is not essential to have one or more antennas on or in the capsule 106. However, where the capsule includes one or more antennas printed on its outer surface there is significant space saving since the antennas are a layer on the outer surface of the capsule. Manufacturing is simplified since the antenna(s) are printed on the outer surface of the capsule and there is no need to connect different physical parts or to cut slots in metal as in other types of antenna technology. Also, robustness is improved since the printed antenna is less likely to malfunction as compared with antennas comprising a plurality of physical components and/or cut away regions. Each printed antenna is connected to a metallic track (not visible in FIG. 1C) running along the outer surface of the capsule to the distal end 120 of the capsule. The metallic track connects to an interface means for interfacing to components in the stylus. In some cases the interface means is one or more metallic spring contacts. In some cases the interface means is a plurality of metallic regions 122 on an end wall of the capsule.

In the example of FIG. 1C the capsule comprises a ground region 118 comprising a conductive region printed on the outer surface of the housing. The ground region 118 provides a ground for components in the stylus when the capsule is in a stylus.

In some cases the capsule 106 incorporates a pressure sensor, to detect pressure on the tip, but this is not essential. In the capsule of FIG. 1B there is no pressure sensor. In the capsule of FIG. 1C there is a pressure sensor (not visible in FIG. 1C). One or more metallic tracks 124 are shown in FIG. 1C and these connect to a pressure sensor within the capsule of FIG. 1C as described in more detail below.

General operation of a stylus and digitizer panel is now explained to aid understanding of the present technology. FIG. 2 is a schematic diagram of an electronic device 202 with a touch sensor panel 263 (referred to as a digitizer herein for brevity) and a digitizer control module 200. Together the digitizer and the digitizer control module 200 form a digitizer device. The electronic device 202 is a smart phone, tablet computer, laptop computer, smart watch or any other type of electronic device with a digitizer 263. The electronic device has at least one processor 220, a memory 230, a communication interface 270 such as a radio communications transceiver, a network card, or any other communication interface for enabling wired or wireless communications with other computing entities. The electronic device has an input/output interface 250 for controlling outputs from the electronic device and for controlling inputs received at the electronic device. The electronic device, in some cases, has a display 260 although this is not essential. The display comprises a display panel 261 which may be located in front of or behind the digitizer 263 such as in a conventional smart phone, tablet computer, or smart watch. In some cases the digitizer 263 is a touch pad which is located remote from the display panel 261 as in the case of a laptop computer such as that illustrated in FIG. 2. A bus 210 connects various of the components of the electronic device 202 such as the digitizer control module 200, the processor 220, the memory 230, the input/output interface 250, the display 260 and the communication interface 270.

Figure 2:
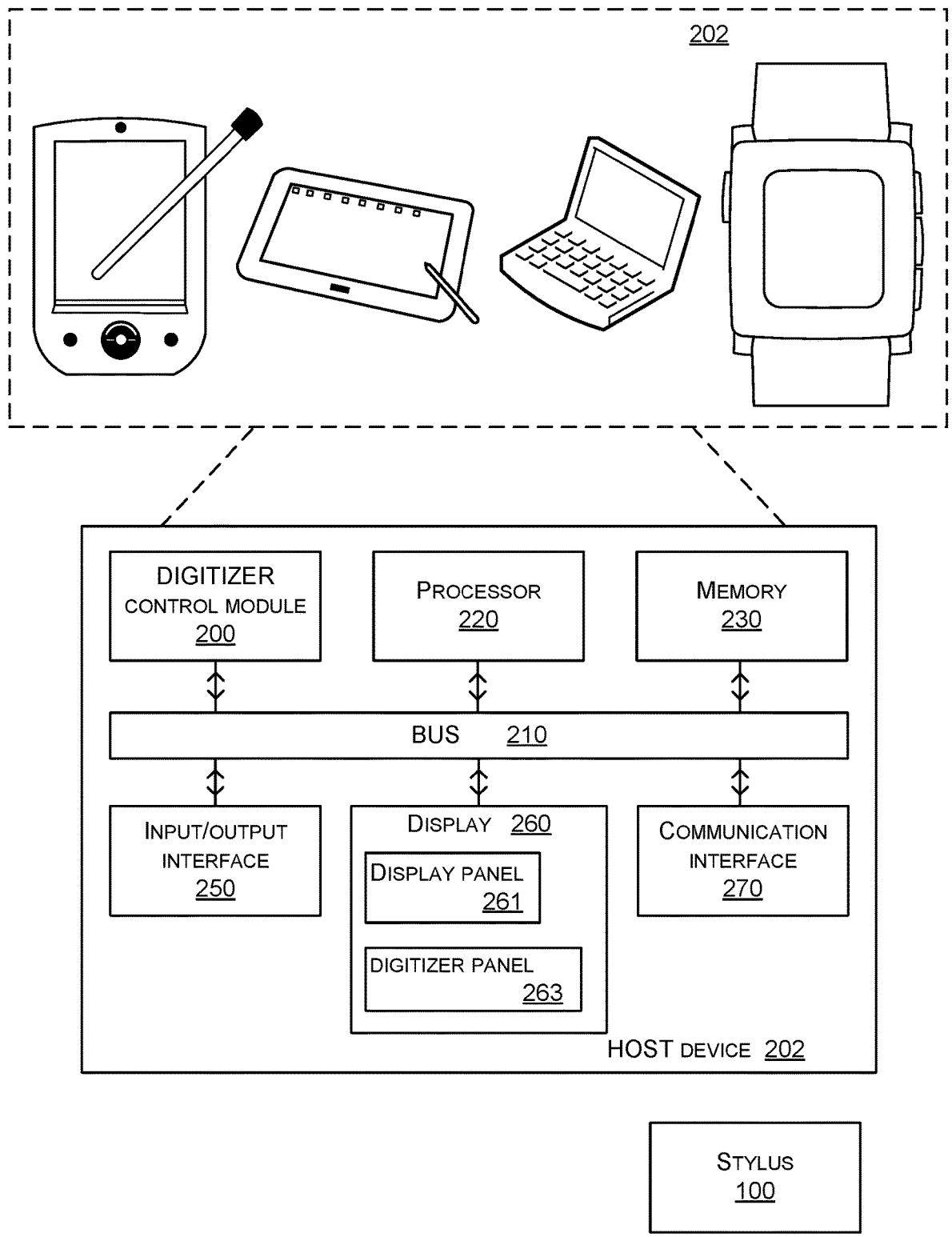
FIG. 2 is a schematic diagram of a computing device with a digitizer panel, and also showing a stylus.

In the example of FIG. 2 the digitizer 263 is shown as part of the display 260 but this is not essential as mentioned above.

The digitizer 263 comprises a first array of electrodes arranged substantially parallel with one another and a second array of electrodes arranged substantially parallel with one another. In some implementations the electrodes in the first array are row electrodes positioned substantially perpendicular to the electrodes in the second array (column electrodes) to form a grid or matrix as illustrated in FIG. 3. While the row electrodes may be referred to as transmit electrodes and the column electrodes may be referred to as receive electrodes, these designations may be reversed with no change in meaning. However, it is not essential for the electrodes to be arranged in a grid. In some cases the row electrodes intersect each column electrode an at angle that is not perpendicular thereby forming a sensor having the form of a parallelogram. In some cases the electrodes form a more complex pattern in which any two rows or columns are not necessarily parallel, or not necessarily laid out along straight lines.

Where the sensor panel is used in front of or within a display (such as a liquid crystal display) the digitizer 263 is substantially transparent to visible wavelengths of light. Specifically, the electrodes in the digitizer are made from transparent conductive material (for example, indium tin oxide), or alternatively, are made from opaque material but with traces so small as to be inconspicuous). In other implementations, the digitizer is not positioned within, in front or behind a display but rather is positioned within a touch pad distinct from the display of the electronic device.

The digitizer 263 is used to measure the capacitance from each row to each column of the electrodes in order to measure the position of an input medium such as a finger, or stylus.

Figure 3:
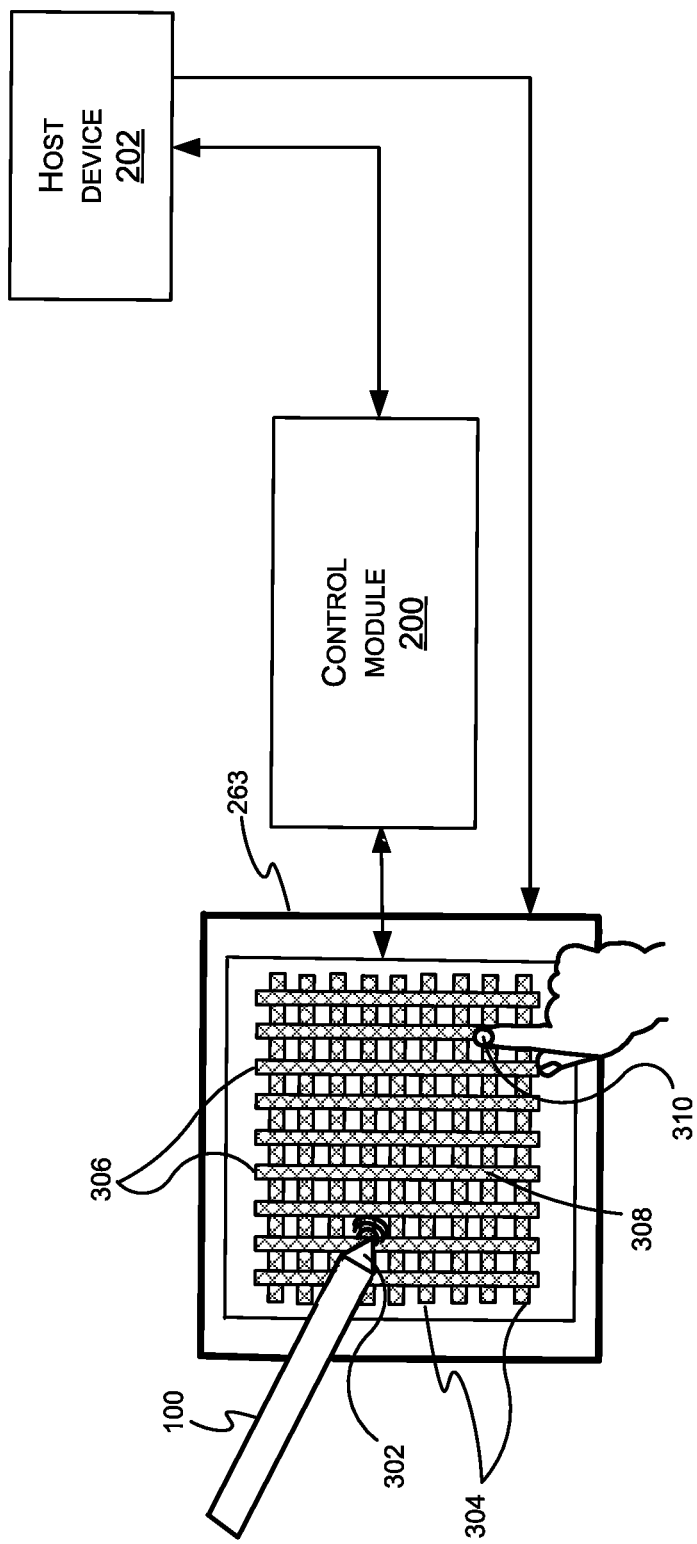
FIG. 3 is a schematic diagram of a digitizer, control module and host device.

FIG. 3 shows the digitizer 263 in more detail in a case where the electrodes of the digitizer are arranged in a grid to form a grid based capacitive sensor. Stylus 100 transmits an electromagnetic signal which is detected by the capacitive sensor. Touch of one or more fingers 310 or other conductive objects is also detectable by the capacitive sensor. The stylus 100 transmits one or more signal bursts and/or pulses that are transmitted at a defined repetition rate. In some examples, a control module 200 of the digitizer manages a synchronization signal for synchronizing signal bursts emitted by stylus 100 with sampling windows for sampling output from the digitizer 263. Optionally one or more signal bursts and/or pulses are transmitted by stylus 100 including information regarding operation of stylus 100 and/or pressure applied on a tip 302 of the stylus. The signal bursts transmitted by stylus 100 are picked up by one or more of the electrodes of the digitizer 263 on both the horizontal and vertical axes of the grid. In some examples the information is decoded by digitizer circuitry in the control module 200. The location of the stylus tip is computed by the control module 200 and sent to host device 202 which is a computing device with which the digitizer is associated.

Optionally a mutual capacitance detection method and/or a self-capacitance detection method are applied on the digitizer 263 for sensing interaction with fingertip 310. The digitizer control module 200 sends a triggering pulse and/or interrogation signal to one or more electrodes 304, 306 of the digitizer and to sample output from electrodes 304, 306 in response to the triggering and/or interrogation. In some embodiments some or all of the electrodes 304 along one axis of the grid are interrogated simultaneously or in a consecutive manner, and in response to each interrogation, outputs from electrodes 306 on the other axis are sampled. This scanning procedure provides for obtaining output associated with each junction 308 of the grid. This provides for detecting one or more conductive objects such as fingertips touching and/or hovering over the digitizer at the same time (multi touch). In some examples, the digitizer control module 200 alternates between scanning the digitizer 263 for detection of one or more fingertips and sampling outputs on both the horizontal and vertical electrodes for location of a signal transmitted by the stylus 100.

The stylus 100 has a tip transmitter located in its tip 102 and the digitizer is able to detect the position of the stylus tip with respect to the digitizer grid by detecting the signal transmitted by the tip transmitter.

In various examples, the stylus has a tilt transmitter. The digitizer is able to detect tilt of the stylus 100 with respect to the plane of the digitizer 263 where the stylus 100 has a tilt transmitter in addition to a transmitter at the tip 302 of the stylus. The stylus contains a transmitter at its tip which transmits a first signal and it contains a second transmitter (referred to as a tilt transmitter) at a tilt point of the transmitter which transmits a second signal, different from the first signal. The control module 200 computes the location on the digitizer 263 of the tip 302 of the stylus 100 using the first signal. The control module 200 computes the location on the digitizer 263 of the signal received from the tilt point of the stylus 100 using the second signal. The control module 200 knows the length of the stylus 100 and is thus able to compute by triangulation the angle between the longitudinal axis of the stylus 100 and the plane of the digitizer 263.

In various examples the stylus has a plurality of transmitters configured to enable the digitizer and control module 100 to detect rotation of the stylus 100.

The digitizer is able to detect position of a distal end of the stylus 100 where the stylus has at least one transmitter at its distal end. Where the distal end of the stylus 100 is used as an eraser the distal end transmitter is referred to as an eraser transmitter.

Figure 4A:
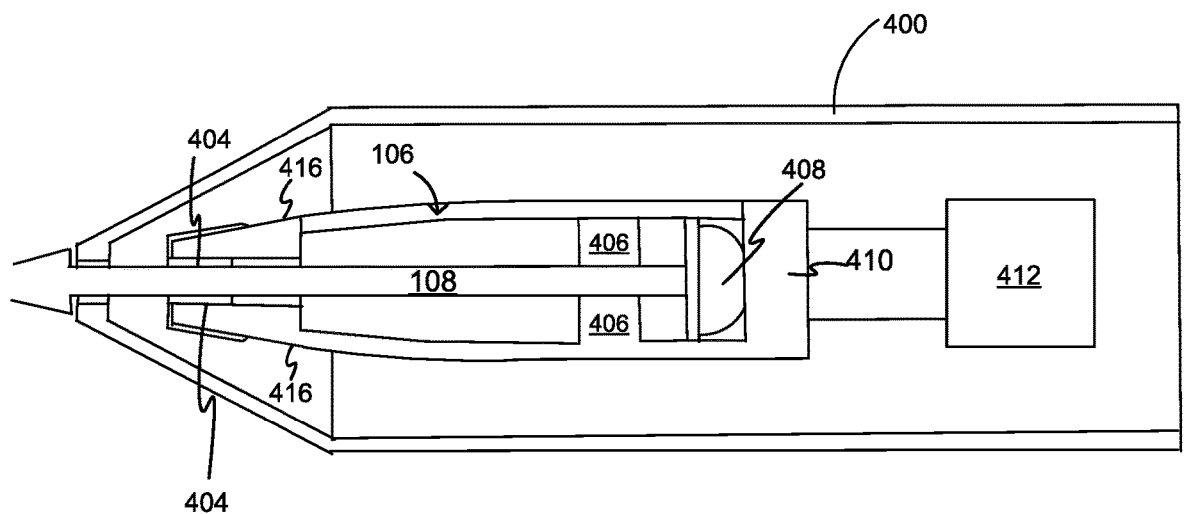
FIG. 4A is cross section through the stylus of FIG. 1A where the stylus incorporates the capsule of FIG. 1C.

FIG. 4A is a cross section through the stylus 100 of FIG. 1a showing the stylus housing 400. Within the stylus is a capsule 106 which is the capsule of FIG. 1C in this case. The capsule 106 has a shaft 108 with the stylus tip at one end of the shaft protruding from the capsule and stylus housing 400. The distal end of the capsule 106 is connected to a printed circuit board 412 and one or more other components in the stylus housing such as a power mechanism. The power mechanism is a battery or a mechanism to receive power from the digitizer.

The capsule has bearing surfaces 406 which act to minimize motion of the shaft in a direction perpendicular to the longitudinal axis of the shaft. At the distal end of the shaft 108 is a pressure sensor 408 which abuts an end wall 410 of the capsule 106. The tip end of the pressure sensor has two printed antennas 404, 416 on its outer surface. One of the printed antennas 404, the one closest to the tip, is connected to the shaft by a metallic track as illustrated in FIG. 4A and acts as the tip antenna (that is the antenna which transmits a signal to the digitizer in order for the location of the tip of the stylus to be detected). The other antenna 416 acts as a tilt antenna. Signals from a printed circuit board within the stylus are sent to the antennas over metallic tracks on a surface of the capsule housing. In some cases signals from the printed circuit board 412 to the tip antenna, which incorporates the tip of shaft 108, travel on a metallic track from the inner surface of an end wall of the capsule 106 to the shaft 108.

In some cases the stylus incorporates a spring between the capsule 106 and the printed circuit board 412 in order to bias the capsule, and hence the shaft 108, towards the tip end of the stylus. In some cases the capsule incorporates one or more springs between the bearing surfaces 406 and the distal end of the shaft and these act to bias the shaft 108 towards the tip.

Figure 4B:
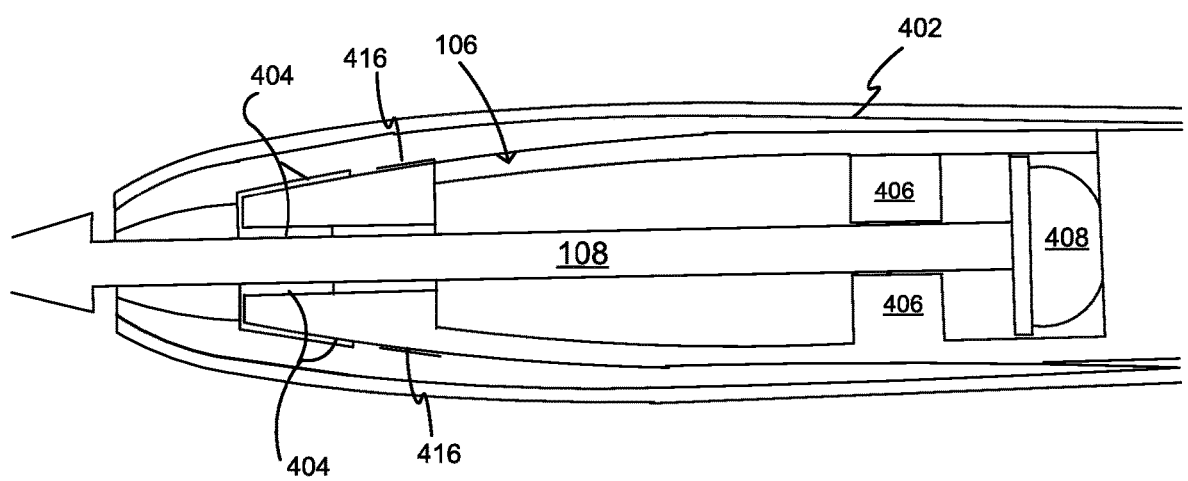
FIG. 4B is a cross-section through another stylus where the stylus incorporates the capsule of FIG. 1C.

The capsule 106 is modular and can be used in other styli. For example, FIG. 4B shows another stylus with a different shaped housing 402 and which is a smaller housing than that of FIG. 4A. The same capsule as that of FIG. 4A is inserted in the stylus of FIG. 4B and it is seen that there is much less space between the capsule 106 and the housing 402 of the stylus.

Figure 5A:
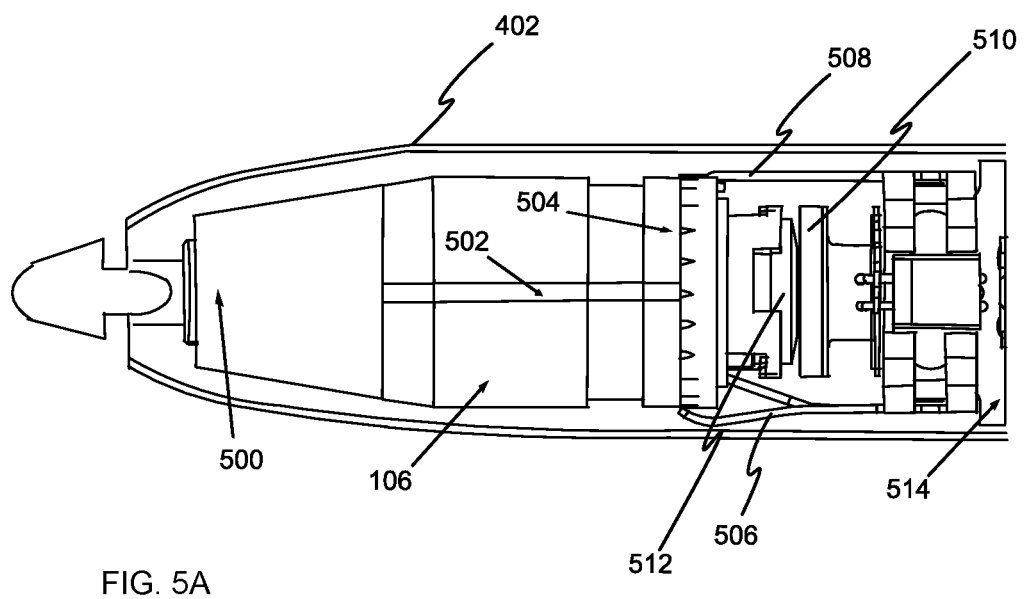
FIG. 5A is shows the stylus of FIG. 4B and with the capsule of FIG. 1B inside the stylus.

FIG. 5A shows the stylus housing 402 of FIG. 4B but this time with capsule 106 of FIG. 1B inside it. The capsule 106 comprises an antenna 500 (such as a tilt antenna or other antenna) printed on the outside of the tapered part of the capsule housing and a metallic track 502 running from the antenna 500 to a metallic region 504 at the distal end of the capsule housing. The distal end of the capsule 106 supports a silicone pad 512 which abuts a pressure sensor 510 in the stylus. The pressure sensor 512 is part of the stylus and a printed circuit board 514 which is part of the stylus is also shown. The printed circuit board 514 is connected to the capsule 106 using spring contacts 508, 506 which are metallic. The spring contacts enable movement of the capsule 106 along its longitudinal axis to be accommodated as pressure is put on the stylus tip in use.

Figure 5B:
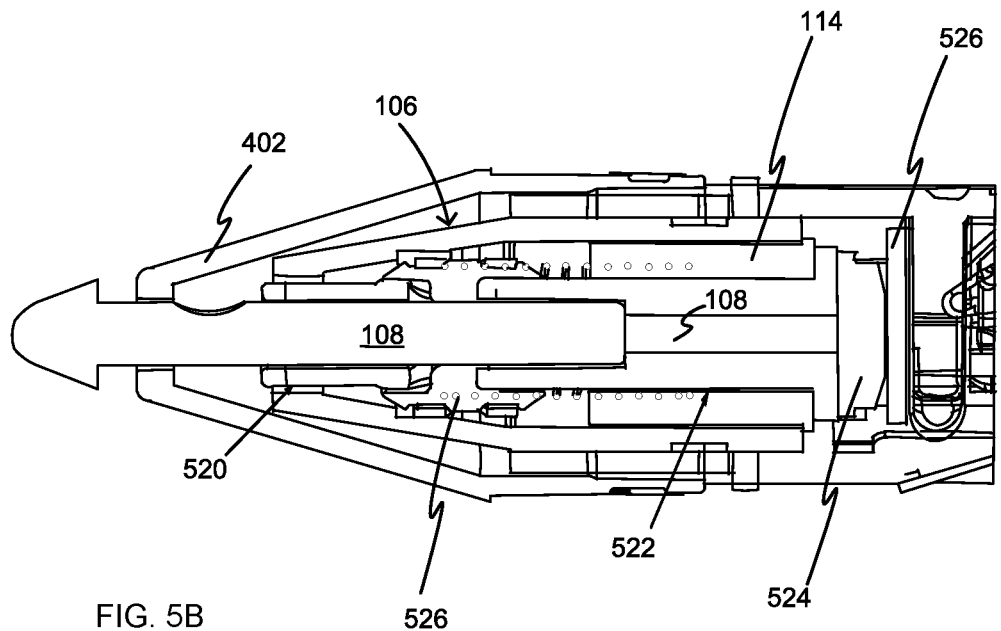
FIG. 5B is a cross-section through the stylus of FIG. 4A and with the capsule of FIG. 1B inside.

FIG. 5B shows the stylus housing 400 of FIG. 4A with capsule 106 of FIG. 1B inside it. The capsule 106 comprises a shaft 108 with a stylus tip at one end protruding from the capsule 106 and stylus housing 400. The shaft 108 bears against bearing surfaces 520, 522 on the interior of the capsule 106 to minimize motion of the shaft 108 in a direction perpendicular to the longitudinal axis of the shaft. A coil spring 526 around the shaft 108 biases the shaft towards the tip of the stylus. A metal flange 114 holds a structure around a distal end of the shaft 108. A silicone pad 524 at the distal end of the shaft abuts a pressure sensor 526 in the stylus.

In the example of FIGS. 5A and 5B the capsule comprises a stylus tip which incorporates a tip antenna. Signals to drive the tip antenna pass from the printed circuit board 504 through spring contact 506 to metallic flange 114 to spring 526 to bearing surface 520 and to the stylus tip. Signals to drive antenna 500 pass from the printed circuit board 504 through spring contact 508 to metallic region 504 to track 502 and to antenna 500.

Figure 6A:
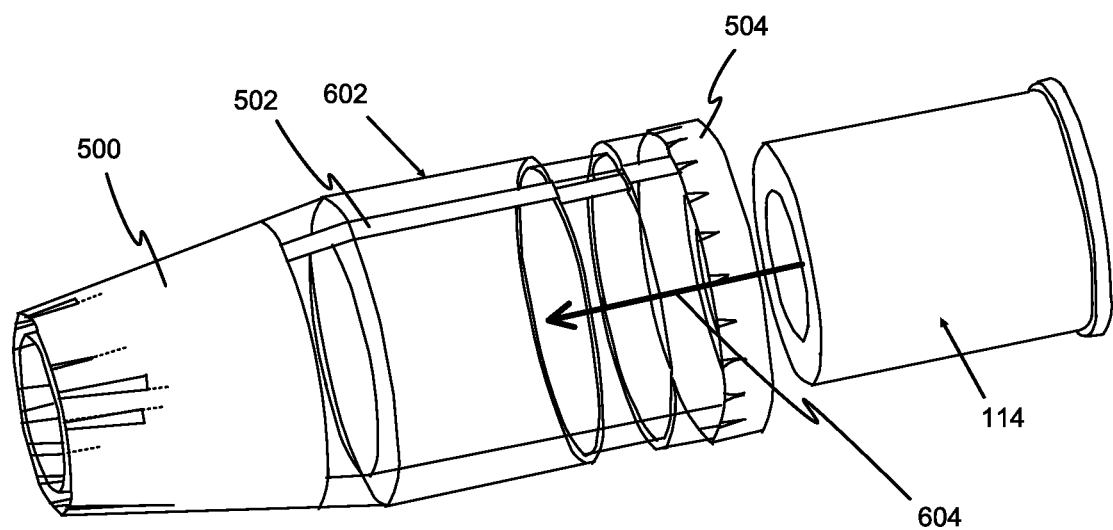
FIG. 6A is a perspective view illustrating assembly of part of the capsule of FIG. 1B.

FIG. 6A shows a process for assembling part of the capsule of FIG. 1B. A metal flange 114 is press fit into a housing 602 of the capsule. The housing has an antenna 500 printed on its outer surface and a metallic track 502 running from the antenna 500 to a distal end of the housing 602. At the distal end of the housing is a ring of conductive material printed onto the outer surface of the housing.

Figure 6B:
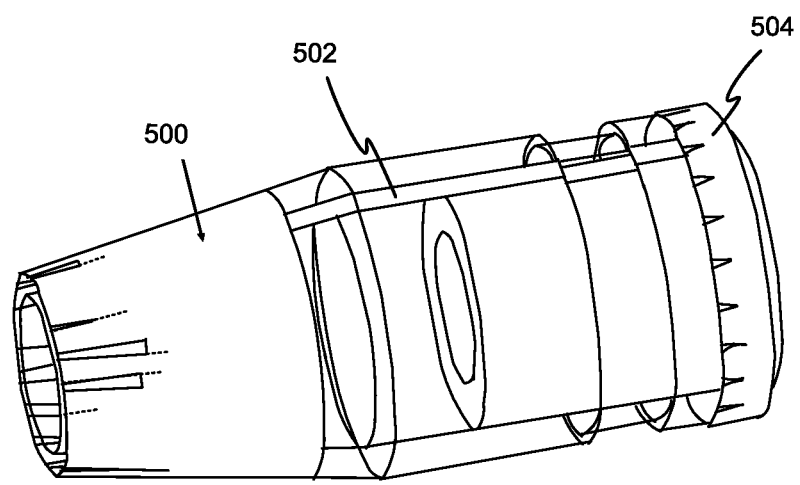
FIG. 6B shows the result of the assembly process of FIG. 6A.

FIG. 6B shows the assembled part of the capsule after the press fit illustrated in FIG. 6A has occurred. The housing 602 is formed of transparent plastics material so that adhesive which is activated using ultra violet light is usable to fix further components into the housing 602.

Figure 7A:
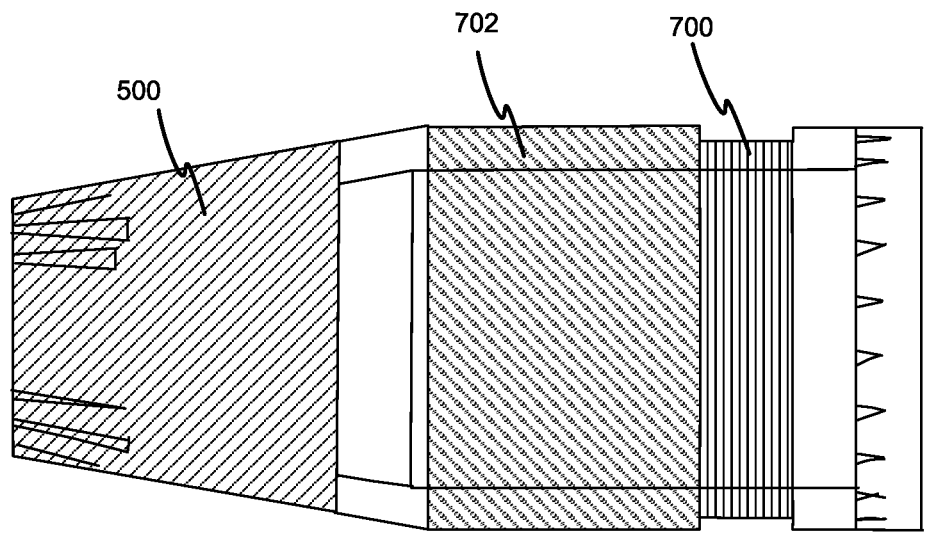
FIG. 7A shows antenna arrangements on an outer surface of part of the capsule of FIG. 1B.

FIG. 7A is a schematic diagram of the capsule of FIG. 1B showing a plurality of antennas 500, 702, 700 comprising metallic material printed onto an outer surface of the capsule housing. In some cases the region 702 is a ground region to be used by components of the stylus. For each antenna a metallic track runs from the antenna over a surface of the capsule housing to the distal end of the capsule housing.

Figure 7B:
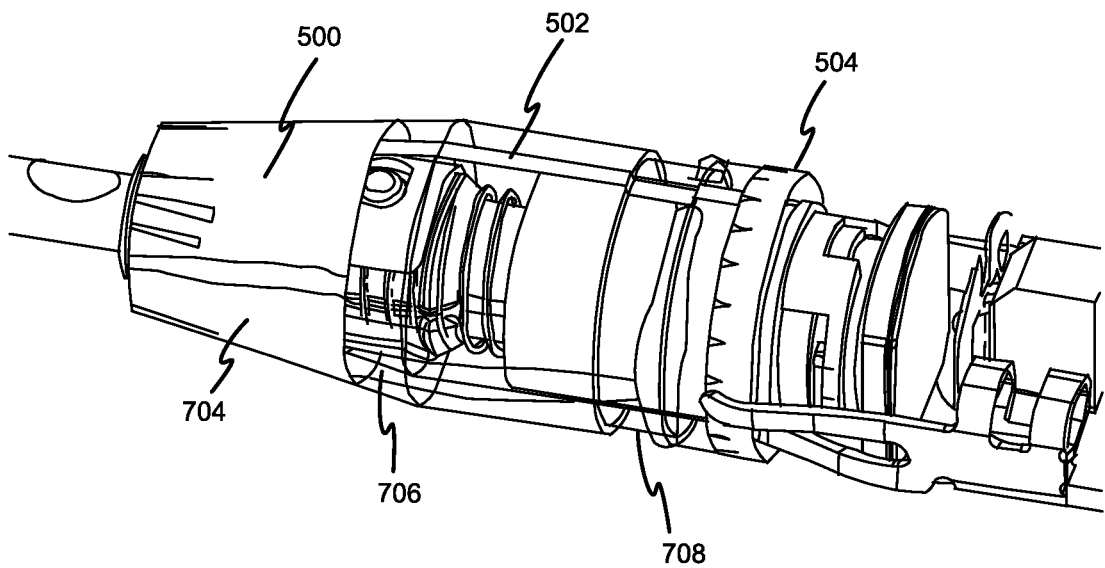
FIG. 7B is a perspective view of components inside the capsule of FIG. 1B and illustrating connection of the capsule to a printed circuit board of a stylus.

FIG. 7B shows a perspective view of the capsule of FIG. 1B in use within a stylus but with the stylus housing itself omitted for clarity. The capsule housing has two printed antennas 500, 704 and metallic tracks 706, 502 running from an antenna to a metallic region 504 at a distal end of the capsule. The coil spring around the shaft in the capsule, and the metal flange, are visible through the transparent capsule housing.

Figure 8A:
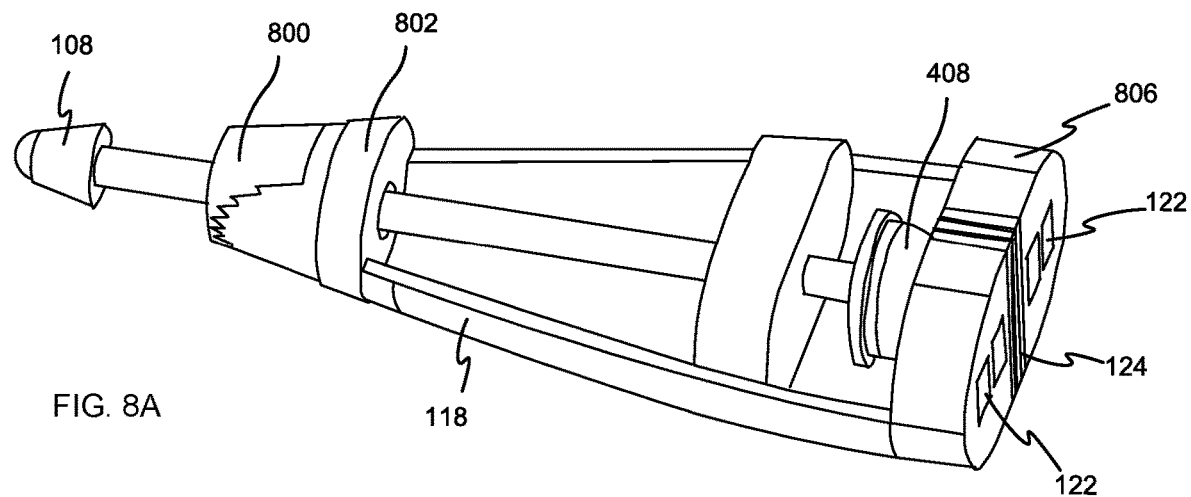
FIG. 8A is a perspective view of the capsule of FIG. 1C with part of the housing cut away.

FIG. 8A is a schematic diagram of the capsule of FIG. 1C with part of the capsule housing cut away to show the shaft 108 connecting the tip of the stylus to a pressure sensor comprising a conductive silicone pad 408. The conductive silicone pad abuts a metallic track on an interior of an end wall 806 of the capsule housing. The metallic track runs from the interior of the end wall 806 to an exterior of the end wall 806 so that components in the stylus are able to connect to receive the pressure sensor data. The end wall 806 also has conductive regions 122 which interface between components in the stylus and antennas 800, 802 of the capsule as well as the stylus tip.

Figure 8B:
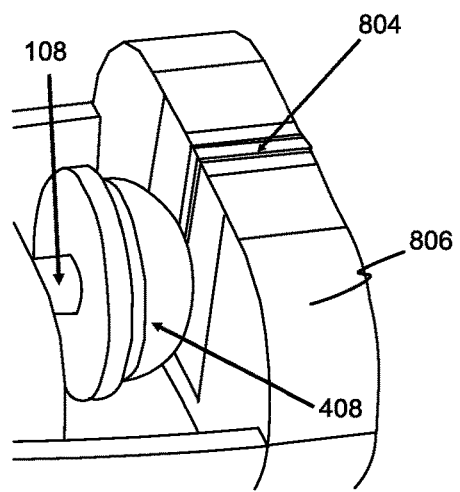
FIG. 8B shows the pressure sensor of the capsule of FIG. 8A in more detail.

FIG. 8B shows the pressure sensor of FIG. 8A in more detail and illustrates how the shaft 108 is connected to the conductive silicone pad 408 which abuts the interior of the end wall 806.

Figure 8C:
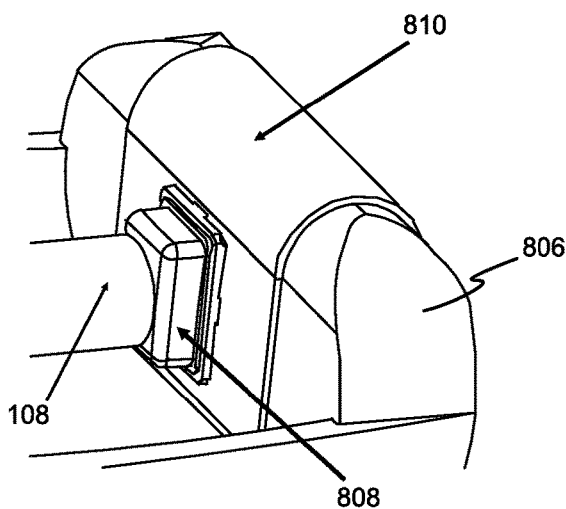
FIG. 8C shows an alternative pressure sensor arrangement for use in the capsule of FIG. 8A.

FIG. 8C shows an alternative pressure sensor for use in the capsule of FIG. 8A. Here the pressure sensor comprises a chip 808 sandwiched between the distal end of shaft 108 and the interior of the end wall 806 of the capsule housing. The chip 808 is mounted on a flexible printed circuit 810 which is supported on the end wall 806 and runs from an inner surface of the end wall 806 to an outer surface of the end wall for connection to components in the stylus.

In the examples of FIG. 8A to C where the pressure sensor is in the capsule, benefits are achieved since any calibration of the pressure sensor is carried out during the manufacture of the capsule. The capsule is then a module ready to be used in various different styli and there is no need to separately calibrate the pressure sensor after installation in the individual styli.

In the examples described herein a biasing mechanism is used to bias the shaft 108 towards a tip of the stylus or capsule. The biasing mechanism comprises a coil spring around the shaft and/or spring contacts between the printed circuit board and the capsule in the embodiments of FIGS. 1B, 5A, 5B, and 7B. The biasing mechanism comprises a spring between the capsule 106 and the printed circuit board, or between a bearing surface in the capsule and the shaft in some cases.

Note that the pressure sensor of FIG. 8C replaces the pressure sensor in the arrangement of FIG. 5A and FIG. 5B in some embodiments.

Alternatively or in addition to the other examples described herein, examples include any combination of the following:

A capsule of a stylus for operation with a digitizer device, the capsule comprising:

a generally cylindrical housing tapered at a tip end and formed from plastics material;

a stylus tip comprising a shaft extending along a longitudinal axis of the interior of the housing and protruding from the tip end of the housing, the shaft being part of a pressure sensing mechanism to sense pressure of the stylus tip on a surface in use;

at least one bearing surface, against which the shaft is guided in use, on an inner surface of the housing; and wherein the capsule is a single entity sized and shaped to fit within a plurality of different styli housings.

The capsule described above comprising at least one antenna printed on an outer surface of the housing.

The capsule described above comprising a tilt antenna printed on an outer surface of the tip end of the surface of the housing and having a conductive track printed on the surface of the housing extending from the tilt antenna to a distal end of the housing.

The capsule described above comprising a silicon pad mounted at a distal end of the housing, and sized and shaped to abut a pressure sensor in the stylus.

The capsule described above comprising a metal flange having a generally cylindrical form and fitting against part of the inner surface of the housing, the metal flange comprising a bearing surface against which the shaft bears in use.

The capsule described above wherein the housing is formed from transparent plastics material.

The capsule described above comprising a ground surface printed on the outside of the housing and configured to provide a ground surface for the stylus in use.

The capsule described above wherein the capsule has an end wall at the distal end of the housing and wherein the end wall has one or more printed conductive regions configured to interface with electrical connections in the stylus.

The capsule described above comprising a pressure sensor at a distal end of the shaft.

The capsule described above wherein the pressure sensor comprises a conductive silicone pad sandwiched between a distal end of the shaft and the end wall.

The capsule described above wherein the end wall has a conductive track running from a region in which the silicone pad contacts the end wall to an outer surface of the end wall for contact with electrical connections of the stylus in use.

The capsule described above comprising a pressure sensing chip mounted on an inner surface of the end wall abutting the distal end of the shaft.

The capsule described above comprising a flexible printed circuit on which the pressure sensing chip is mounted, the flexible printed circuit running from the inner surface of the end wall to an outer surface of the end wall for connection to a stylus in use.

The capsule described above comprising a biasing component configured to bias the shaft towards the stylus tip.

A stylus comprising a capsule as described above.

A method of manufacturing a stylus for operation with a digitizer device, the method comprising:
inserting a capsule into a housing of the stylus, the capsule comprising:
a generally cylindrical housing tapered at a tip end and formed from plastics material;
a stylus tip comprising a shaft extending along a longitudinal axis of the interior of the housing and protruding from the tip end of the housing;
at least one bearing surface, against which the shaft is guided in use, on an inner surface of the housing; and
wherein the capsule is a single entity sized and shaped to fit within a plurality of different styli housings; and
connecting the capsule to a printed circuit board of the stylus body.

The method described above comprising connecting the capsule to the printed circuit board using one or more spring contacts connected between a conductive region printed on an outer surface of the capsule distal end and the printed circuit board.

The method described above comprising connecting the capsule to the printed circuit board by placing conductive regions, printed on an outer surface of an end wall of the capsule, into contact with electrical connections in the stylus.

A capsule of a stylus for operation with a digitizer device, the capsule comprising:
a generally cylindrical housing tapered at a tip end and formed from plastics material;
a stylus tip comprising a shaft extending along a longitudinal axis of the interior of the housing and protruding from the tip end of the housing, the shaft being part of a pressure sensing mechanism to sense pressure of the stylus tip on a surface in use;
at least one antenna printed on an outer surface of the housing; and
wherein the capsule is a module sized and shaped to fit within a plurality of different styli housings.

The capsule described above further comprising a conductive track printed on the outer surface of the housing and extending from the antenna to a distal end of the housing.

A capsule of a stylus for operation with a digitizer device, the capsule comprising:
a generally cylindrical housing tapered at a tip end and formed from plastics material;
a stylus tip comprising a shaft extending along a longitudinal axis of the interior of the housing and protruding from the tip end of the housing, the stylus tip comprising a tip antenna;
at least one antenna printed on an outer surface of the housing; and wherein the capsule is a single entity sized and shaped to fit within a plurality of different styli housings.

By including in the capsule, both the tip antenna and the at least one printed antenna, the assembly process of assembling the stylus is simplified and this enables manufacturing costs to be reduced. Having the at least one printed antenna on the outer surface of the housing is simpler to manufacture than examples where the printed antenna is on an inner surface of a component of the stylus.

A method of manufacturing a stylus for operation with a digitizer device, the method comprising:
inserting a capsule into a housing of the stylus, the capsule comprising:
a generally cylindrical housing tapered at a tip end and formed from plastics material;
a stylus tip comprising a shaft extending along a longitudinal axis of the interior of the housing and protruding from the tip end of the housing, the stylus tip comprising a tip antenna;
at least one antenna printed on an outer surface of the housing;
wherein the capsule is a single entity sized and shaped to fit within a plurality of different styli housings; and
connecting the capsule to a printed circuit board of the stylus body.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A capsule of a stylus for operation with a digitizer device, the capsule comprising:
   a generally cylindrical housing tapered at a tip end;
   a stylus tip comprising a shaft extending along a longitudinal axis of the interior of the housing and protruding from the tip end of the housing, the stylus tip comprising a tip antenna;
   at least one antenna printed on an outer surface of the housing; and
   at least one bearing surface extending along a longitudinal axis of the interior of the housing and proximate to the shaft of the stylus tip, against which the shaft is guided in use, on an inner surface of the housing,
   wherein the housing, including the at least one antenna and the at least one bearing surface, is removable from a plurality of differently-shaped styli housings;
   wherein the capsule is an entity sized and shaped to fit within the plurality of differently-shaped styli housings.

2. The capsule of claim 1 where the shaft is part of a pressure sensing mechanism to sense pressure of the stylus tip on a surface in use.

3. The capsule of claim 1 where the at least one antenna comprises a tilt antenna printed on an outer surface of the tip end of the surface of the housing and having a conductive track printed on the surface of the housing extending from the tilt antenna to a distal end of the housing.

4. The capsule of claim 1 comprising a silicon pad mounted at a distal end of the housing, and sized and shaped to abut a pressure sensor in the stylus.

5. The capsule of claim 1 comprising a metal flange having a generally cylindrical form and fitting against part of the inner surface of the housing, the metal flange comprising the at least one bearing surface against which the shaft bears in use.

6. The capsule of claim 1 further comprising:
   the plurality of differently-shaped styli housings having either more or less space between the capsule and the housing of the other styli;
   the at least one bearing surface configured to perform a plurality of actions comprising:
   minimizing a side to side movement of the shaft within the capsule, and conveying forces along the longitudinal axis of the shaft within the capsule, based on lateral forces being exerted on the tip end of the capsule while the stylus is operated with the digitizer device; and
   the at least one bearing surface being located wholly within the capsule and performing the plurality of actions mechanically unaided by a stylus housing of the plurality of differently-shaped styli housings.

7. The capsule of claim 1 comprising a ground surface printed on the outside of the housing and configured to provide a ground surface for the stylus in use.

8. The capsule of claim 1 wherein the capsule has an end wall at the distal end of the housing and wherein the end wall has one or more printed conductive regions configured to interface with electrical connections in the stylus.

9. The capsule of claim 1 comprising a pressure sensor at a distal end of the shaft.

10. The capsule of claim 9 wherein the pressure sensor comprises a conductive silicone pad positioned between a distal end of the shaft and the end wall, and the end wall has a conductive track running from a region in which the silicone pad contacts the end wall to an outer surface of the end wall for contact with electrical connections of the stylus in use.

11. The capsule of claim 9 comprising a pressure sensing chip mounted on an inner surface of the end wall abutting the distal end of the shaft.

12. The capsule of claim 11 comprising a flexible printed circuit on which the pressure sensing chip is mounted, the flexible printed circuit running from the inner surface of the end wall to an outer surface of the end wall for connection to a stylus in use.

13. The capsule of claim 1 wherein the capsule is a modular capsule for use in the plurality of differently-shaped styli housings;
   the modular capsule for use in the plurality of differently-shaped styli housings without calibration of a pressure sensor of the capsule after installation of the capsule into the plurality of differently-shaped styli housings.

14. The capsule of claim 1 comprising a biasing component configured to bias the shaft towards the stylus tip.

15. A stylus comprising a capsule as claimed in claim 1.

16. A method of manufacturing a stylus for operation with a digitizer device, the method comprising:
   inserting a capsule into a housing of the stylus, the capsule comprising:
   a generally cylindrical housing tapered at a tip end;
   a stylus tip comprising a shaft extending along a longitudinal axis of the interior of the housing and protruding from the tip end of the housing, the stylus tip comprising a tip antenna;
   at least one antenna printed on an outer surface of the housing;
   at least one bearing surface extending along a longitudinal axis of the interior of the housing and proximate to the shaft of the stylus tip, against which the shaft is guided in use, on an inner surface of the housing,
   wherein the housing, including the at least one antenna and the at least one bearing surface, is removable from a plurality of differently-shaped styli housings;
   wherein the capsule is an entity sized and shaped to fit within the plurality of differently-shaped styli housings; and connecting the capsule to a printed circuit board of the stylus body.

17. The method of claim 16 comprising connecting the capsule to the printed circuit board using one or more spring contacts connected between a conductive region printed on an outer surface of the capsule distal end and the printed circuit board.

18. The method of claim 16 comprising connecting the capsule to the printed circuit board by placing conductive regions, printed on an outer surface of an end wall of the capsule, into contact with electrical connections in the stylus.

19. A capsule of a stylus for operation with a digitizer device, the capsule comprising:
- a generally cylindrical housing tapered at a tip end;
- a stylus tip comprising a shaft extending along a longitudinal axis of the interior of the housing and protruding from the tip end of the housing, the shaft being part of a pressure sensing mechanism to sense pressure of the stylus tip on a surface in use;
- at least one antenna printed on an outer surface of the housing; and
- at least one bearing surface, against which the shaft is guided in use, on an inner surface of the housing,
- wherein the housing, including the at least one antenna and the at least one bearing surface, is removable from a plurality of differently-shaped styli housings;
- wherein the capsule is a module sized and shaped to fit within the plurality of differently-shaped styli housings.

20. The capsule of claim 19 further comprising a conductive track printed on the outer surface of the housing and extending from the antenna to a distal end of the housing.

* * * * *